(12) United States Patent
Farley et al.

(10) Patent No.: US 11,869,337 B2
(45) Date of Patent: Jan. 9, 2024

(54) FIRE ALARM PERIPHERAL ADDRESSING USING A SMARTPHONE

(71) Applicant: Johnson Controls Fire Protection LP, Boca Raton, FL (US)

(72) Inventors: Joseph D. Farley, Boca Raton, FL (US); Alan J. Boguslawski, Boca Raton, FL (US); Valerie A. Moore, Boca Raton, FL (US)

(73) Assignee: Johnson Controls Fire Protection LP, Boca Raton, FL (US)

( * ) Notice: Subject to any disclaimer, the term of this patent is extended or adjusted under 35 U.S.C. 154(b) by 120 days.

(21) Appl. No.: 17/428,550

(22) PCT Filed: Apr. 25, 2019

(86) PCT No.: PCT/US2019/029185
§ 371 (c)(1),
(2) Date: Aug. 4, 2021

(87) PCT Pub. No.: WO2020/162957
PCT Pub. Date: Aug. 13, 2020

(65) Prior Publication Data
US 2022/0198915 A1 Jun. 23, 2022

Related U.S. Application Data

(60) Provisional application No. 62/801,469, filed on Feb. 5, 2019.

(51) Int. Cl.
| G08B 25/00 | (2006.01) |
| G06K 7/10 | (2006.01) |
| G06K 7/14 | (2006.01) |
| G08B 17/06 | (2006.01) |

(Continued)

(52) U.S. Cl.
CPC ....... *G08B 25/003* (2013.01); *G06K 7/10386* (2013.01); *G06K 7/1417* (2013.01);
(Continued)

(58) Field of Classification Search
CPC ...... G08B 25/003; G08B 17/10; G08B 29/18; G06K 7/10386; G06K 7/1417
See application file for complete search history.

(56) References Cited

U.S. PATENT DOCUMENTS

| 6,686,838 B1 * | 2/2004 | Rezvani ................ H04W 60/04 709/224 |
| 8,988,217 B2 | 3/2015 | Piccolo, III |

(Continued)

FOREIGN PATENT DOCUMENTS

| EA | 0546401 A1 | 6/1993 |
| WO | 2018071214 A1 | 4/2018 |

OTHER PUBLICATIONS

International Search Report and Written Opinion issued in International Patent Application No. PCT/US2019/029185 dated Mar. 12, 2019.

*Primary Examiner* — John A Tweel, Jr.
(74) *Attorney, Agent, or Firm* — ArentFox Schiff LLP

(57) ABSTRACT

An emergency alarm system peripheral, such as a hazard detector, intrusion detector, or a notification appliance, includes a base that is permanently installed on a wall or ceiling, and a head which mounts to the base. Various embodiments and methods are provided to easily and efficiently assign addresses to the peripherals in the system.

20 Claims, 10 Drawing Sheets

(51) Int. Cl.
  *G08B 17/10* (2006.01)
  *G08B 21/02* (2006.01)
  *H04B 5/00* (2006.01)
  *G08B 29/18* (2006.01)
  *G08B 25/10* (2006.01)

(52) U.S. Cl.
  CPC ............ *G08B 17/06* (2013.01); *G08B 17/10* (2013.01); *G08B 21/02* (2013.01); *G08B 29/18* (2013.01); *H04B 5/0025* (2013.01); *G08B 25/10* (2013.01)

(56) References Cited

U.S. PATENT DOCUMENTS

| | | |
|---|---|---|
| 9,058,731 B2 | 6/2015 | Andrews et al. |
| 9,619,125 B2 | 4/2017 | Ruszala |
| 9,820,315 B2 | 11/2017 | Le Guen et al. |
| 10,291,292 B2 | 5/2019 | Rumler et al. |
| 11,062,593 B2 | 7/2021 | Oliver et al. |
| 11,064,361 B2 * | 7/2021 | Yao ........................ H04W 4/70 |
| 11,557,193 B2 * | 1/2023 | Farley .................... G08B 21/02 |
| 11,640,758 B2 * | 5/2023 | Farley ................... G08B 25/003 |
| | | 340/514 |
| 2005/0052097 A1 | 3/2005 | Tanaka et al. |
| 2007/0008099 A1 | 1/2007 | Kimmel et al. |
| 2012/0154141 A1 | 6/2012 | Piccolo, III |
| 2013/0223279 A1 * | 8/2013 | Tinnakornsrisuphap ................... |
| | | H04L 41/0809 |
| | | 370/254 |
| 2014/0349707 A1 | 11/2014 | Bang |
| 2021/0056834 A1 | 2/2021 | Wolff |

\* cited by examiner

Layout of Dial Grooves

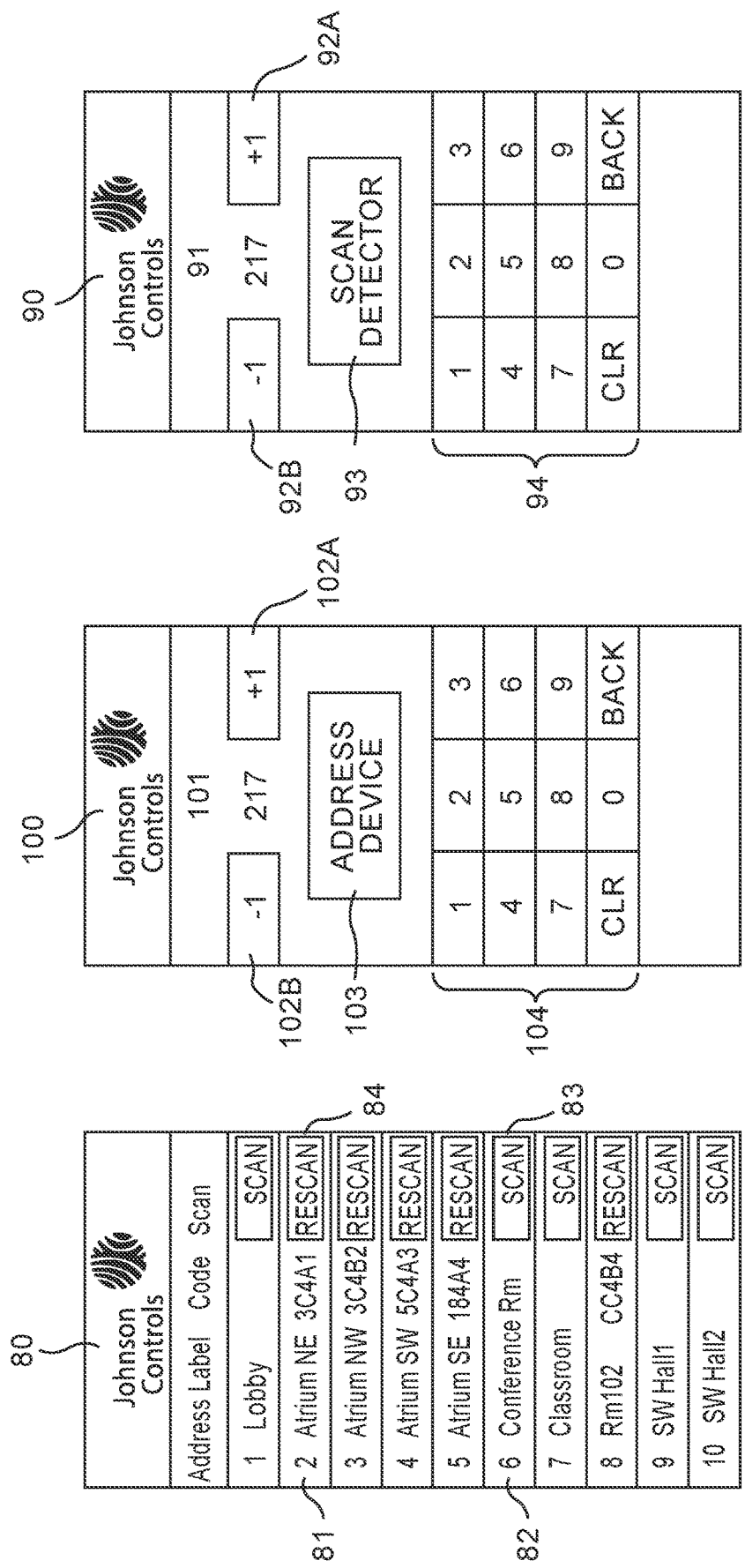

FIRE ALARM PERIPHERAL ADDRESSING USING A SMARTPHONE

CROSS-REFERENCE TO RELATED APPLICATIONS

The present application is a 35 U.S.C. § 371 National Phase Application of PCT Application No. PCT/US2019/029185 filed Apr. 25, 2019 entitled "CAPACITIVE SWITCH DETECTOR ADDRESSING," which claims priority to U.S. Provisional Application No. 62/801,469, entitled "CAPACITIVE SWITCH DETECTOR ADDRESSING" filed Feb. 5, 2019, which is assigned to the assignee hereof and hereby expressly incorporated by reference in its entirety herein.

BACKGROUND

Traditionally, addressable fire alarm peripherals (such as smoke sensors, heat sensors, pull stations, and notification appliances) are assigned addresses using either mechanical or electronic methods. Many such devices consist of a base which is typically attached to an electrical box for permanent or semi-permanent installation. A "head" containing the sensors or annunciators (lights, sounders, etc.) can then be removably attached to a base for easy cleaning and/or replacement. Mechanical addressing methods include, for example, rotary switches or binary DIP switches located in either the device head itself or its base. Electronic addressing methods typically require the use of a proprietary tool that connects to the device and writes an address that the device stores electronically in non-volatile memory.

SUMMARY

An emergency alarm system peripheral, such as a hazard detector (including but not limited to detection of smoke, heat, CO, $CO_2$, flame, natural gas or other toxic or noxious chemicals, pull stations), intrusion detector (including but not limited to window and door contacts, glass break sensors, water or water level sensors, passive infra-red detectors) or a notification appliance (including but not limited to sirens, voice alerts, strobes), includes a base and a head. The base is typically mounted on a wall or ceiling, in front of an electrical box. The head, which houses the actual sensor(s) or notification transponder(s), is attached to the base during installation or replacement.

Most of the Description below refers to "detector heads", but for the purposes of this invention, "detector head" includes the transponder part of a notification appliance device that can attach to a base.

In at least one embodiment of the invention, the base includes a bank of non-electrical switches, each having a metallic plate that may be manually moved to one of two (or more) positions. The head includes a bank of electrical node pairs, each pair corresponding to one of the switches, and having a node capacitance between them. When the head is, e.g., mechanically attached to the base, each node pair is in proximity to its corresponding switch. In alternative implementations, the head may be attached to the base via one or more magnets. In the case of a two-position switch, the metallic plate can be placed in a first position in which it virtually overlaps both nodes of a node pair. In a second position, the metallic plate may not overlap either of the nodes, or may partially overlap one of the nodes.

In the first position, there is a first capacitive value between the nodes such that the nodes are capacitively coupled such that a high frequency signal sees a low impedance and passes through. In the second position, there is a second capacitive value such that the nodes are not capacitively coupled or provide a very high impedance to the high frequency signal. The head further comprises circuitry for determining the position of the metallic plate based on the amplitude of the high frequency signal after the signal has passed (or not) through the node pair.

In an alternative embodiment, an addressable device such as a detector head or base includes a Near-Field Communication (NFC) transponder for receiving an address to be assigned to the device, the address transmitted from a smartphone via the smartphone's NFC transponder. The address may be stored in a non-volatile memory on the device.

To help the process, the installer can make use of an app running on a smartphone or other wireless portable device. The app may present a user interface by which a user can identify the alarm device and assign an address to the alarm device. When the smartphone is placed in proximity to the addressable device and the installer activates a transfer, the smartphone may transmit the assigned address via the smartphone's (NFC) transponder to the alarm device. The communication between smartphone and addressable device could, if desirable, contain additional information as well.

Where the address is received and stored in the base, the head may have its own NFC transponder that reads the stored address from the base. The head may then report the address to a fire panel.

In yet another embodiment, each switch includes a non-electrical adjustable (configurable) reflecting surface that reflects light in a first position and that does not reflect light in a second position. The switch may toggle between the first position and the second position. A light source and light detector pair may correspond to each switch such that when the head is mounted to the base, the light source/detector pair is positioned opposite the switch to enable detection of the reflecting surface's position.

Another embodiment uses a label with corresponding multiple detection zones instead of switches. Each zone may be darkened, for example, by the installer with a marker, or not darkened. Light source/detector pairs correspond to the zones. A darkened zone will not reflect significant light back to the light detector, and an undarkened zone will. Thus the head is able to determine the whether the zone has been darkened.

Another embodiment uses a dial having concentric darkened partial bands or rings having different radii. Light source/detector pairs correspond to each band, and depending on the position of the dial, the pattern of light and dark bands at the light source/detector pairs determines the address value. The darkened portions of the bands may be implemented as grooves that do not reflect light from the light source to the light detector. Alternatively, the pattern of light and dark rings may be printed on the dial. Multiple dials may be used to increase the available address space.

Another embodiment uses a dial having a reflector that reflects light from a central light source to one of many light detectors located circumferentially around the light source. Thus only one of the light detectors detects light, depending on the position of the dial. Alternatively, a single light detector may be located in the center, surrounded by plural light sources. The light sources are flashed one at a time so that when light is detected by the light detector, it can be determined which light source was active, and therefore the position of the dial can be determined.

In another embodiment, a bar code or QR code or similar having the address thereon may be attached to the base by the installer and read by a reader in the head.

In yet another embodiment, computer executable code for an installer app executing on a smartphone, may cause the smartphone to display a user interface listing plural addresses, and for each address, a descriptive label with which the address is to be associated. An installer may activate a control button corresponding to that address, which signals the computer executable code to perform a scan using the smartphone's camera to read a unique identifier on a base or head to be installed at the location associated with the label. The smartphone app may then communicate the selected address and the scanned unique identifier to an external resource, such as a fire panel or intrusion panel. The unique identifier may comprise one or more of a bar code, a QR code, or text, or other visually decipherable patterns capable of holding unique identifier information. Once the address is assigned, it and optionally the unique identifier may be stored in non-volatile memory in the device.

The smartphone and base (or head) may each have their own Near-Field Communication (NFC) transponders. When the smartphone reads and identifies the unique identifier, the unique identifier may be transferred via NFC transmission from the smartphone to the head (or base) stored in non-volatile memory, and then communicated to the external resource.

It should be noted that the term smartphone includes smartphones as well as other electronic mobile devices such as smart pads and smart wearables.

BRIEF DESCRIPTION OF THE DRAWINGS

FIG. 8A is an illustration of an example of a mobile device user interface for an installer for a unique identifier addressing embodiment.

FIG. 9 is an illustration of an example of a mobile device user interface for an installer for an alternative unique identifier addressing embodiment.

FIG. 10 is an illustration of an example of a mobile device user interface for an installer for a mobile device addressing embodiment.

DESCRIPTION

Embodiments described below employ a mechanical-only set of switches in a device base for addressing purposes.

I. Capacitive Switch Detector Addressing Solutions

In at least one embodiment, the switches are located in a device base, and each switch consists of a metallic plate slideable between two positions. The switch itself is non-electrical; the metal plates simply slide between positions and are strictly passive, having no energy source or electrical connections of their own, nor are they physically connected to any electrical component. The detector itself has PCB tracks corresponding to each switch in the base, such that when the head is installed onto the base, each pair of tracks (nodes) is proximate a corresponding switch on the base. The position of the corresponding metallic plate determines a capacitance between the pair of tracks (node pairs). A corresponding circuit connected to each track detects the capacitance of the node pair, and from that, the position of the related switch.

In an embodiment, a high-frequency signal generator generates a high-frequency signal designed to capacitively stimulate the switch's metallic plate, and the other circuit detects the presence of the high-frequency signal when coupled by the switch's metallic plate when it is in a first position, and the absence of the high-frequency signal when the metallic plate is in a second position.

Figure 1:
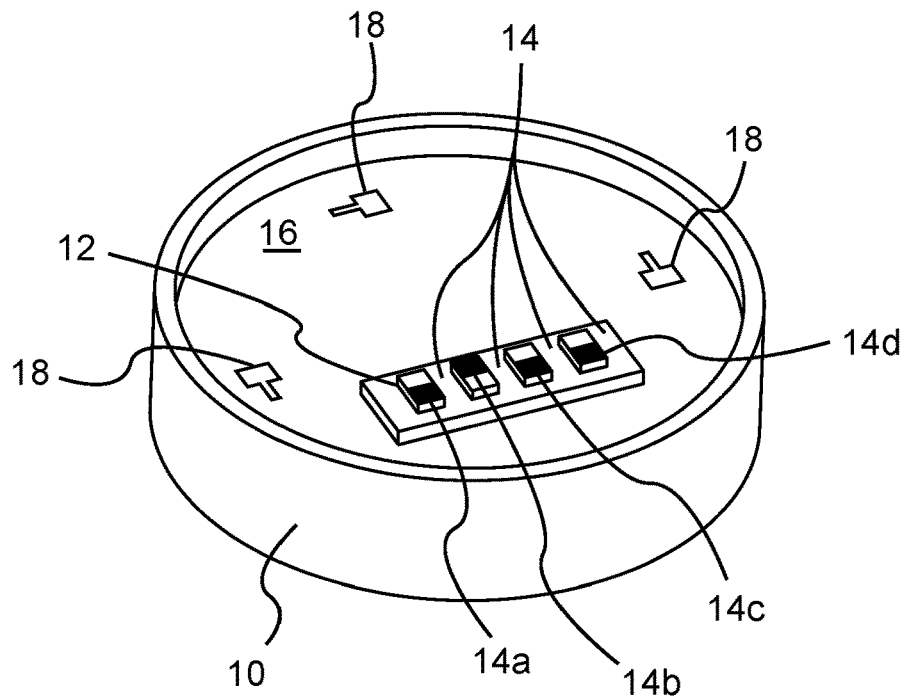
FIG. 1 is a perspective side view of an example of a device base in a capacitive switch embodiment.

FIG. 1 is a perspective view of the side of the base 10 that attaches to and faces the head (described below with respect to FIG. 2). The base includes a group of switches 12. For exemplary purposes, four individual switches 14 are shown; however one skilled in the art can see that there could be fewer or more switches, depending on the length of the address needed. Of course, the switches could be used to indicate parameters other than or in addition to an address, such as a group ID, whether to enable a sounder or not, etc.

Each switch 14 includes a metallic plate 14a-14d which in some embodiments is movably positionable, e.g., slideable, between two positions. For example, metallic plates 14a, 14c and 14d are in a first position, while plate 14b is in a second position. This could indicate, for example, that this device is to have an address $1011_2$ or $11_{10}$. The subscript "2" indicates a base 2 number and the subscript "10" indicates a base 10 number.

Figure 2:
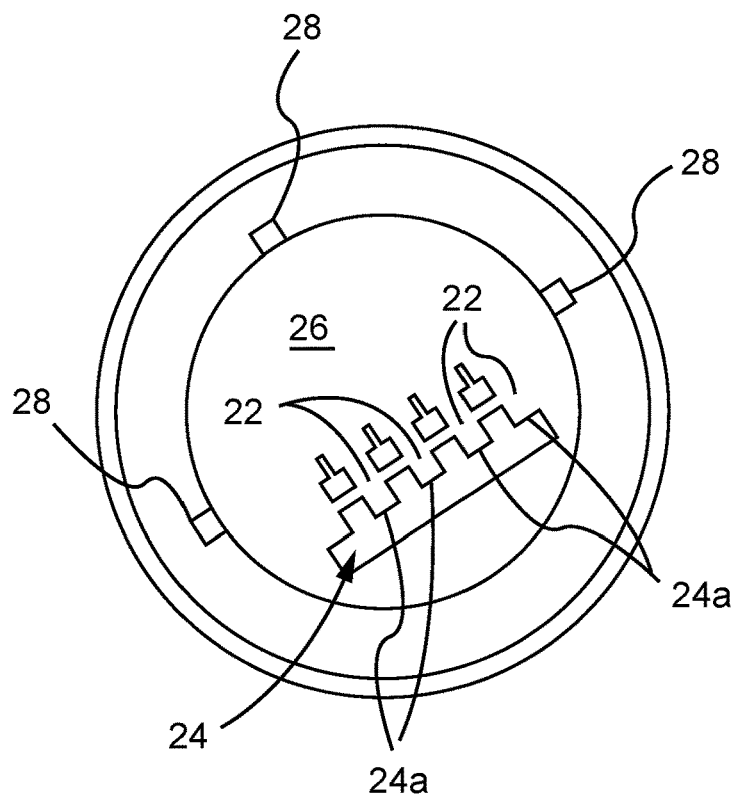
FIG. 2 is a side view of an example of a device head in the capacitive switch embodiment of FIG. 1.

FIG. 2 is a view of the side 16 of the device head 20 that attaches to and faces the base 10 (FIG. 1). A printed circuit board (PCB) 26 has a modulated PCB track 24 that is electronically coupled to a high-frequency signal generator (not shown). The modulated track may have extended fingers 24a corresponding to each address switch on the base. Separate tracks 22 corresponding to each finger are proximate but electrically isolated from respective fingers 24a.

Looking at both FIGS. 1 and 2, it can be seen that electrical contacts 28 lock the head 20 into the contacts 18 in the base 10, such that the head can only be installed in one way, thus ensuring that node pair (22, 24a) on the base lies aligns with a corresponding switch 14a.

Figure 3:
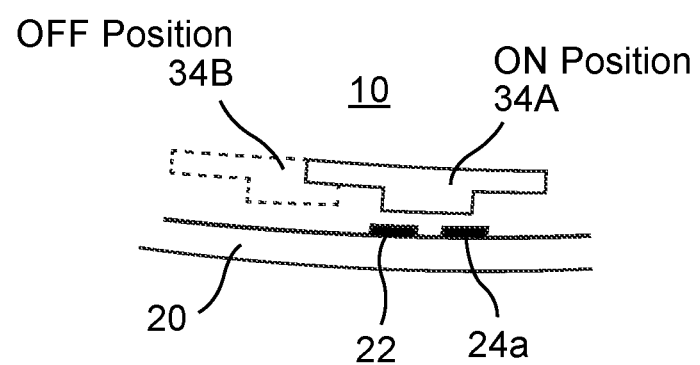
FIG. 3 is an example of drawing illustrating the physical matching of a metallic plate switch for a device base and a node pair for a device head, when the device head is installed onto the device base in the capacitive switch embodiment of FIGS. 1-2.

FIG. 3 illustrates a side view of a matching switch 14 and node pair (22, 24a) when the head 20 is installed onto the base 10. It can be seen that when the metallic plate is in the ON Position 34A, it is proximate the two nodes 22, 24, and interacts with the nodes to change the capacitance between the nodes. When the plate is in the OFF Position 34B, as shown in this example, it not proximate either node, and has very little if any interaction with them, such that there is little to no capacitance between the nodes 22, 24a.

Figure 4:
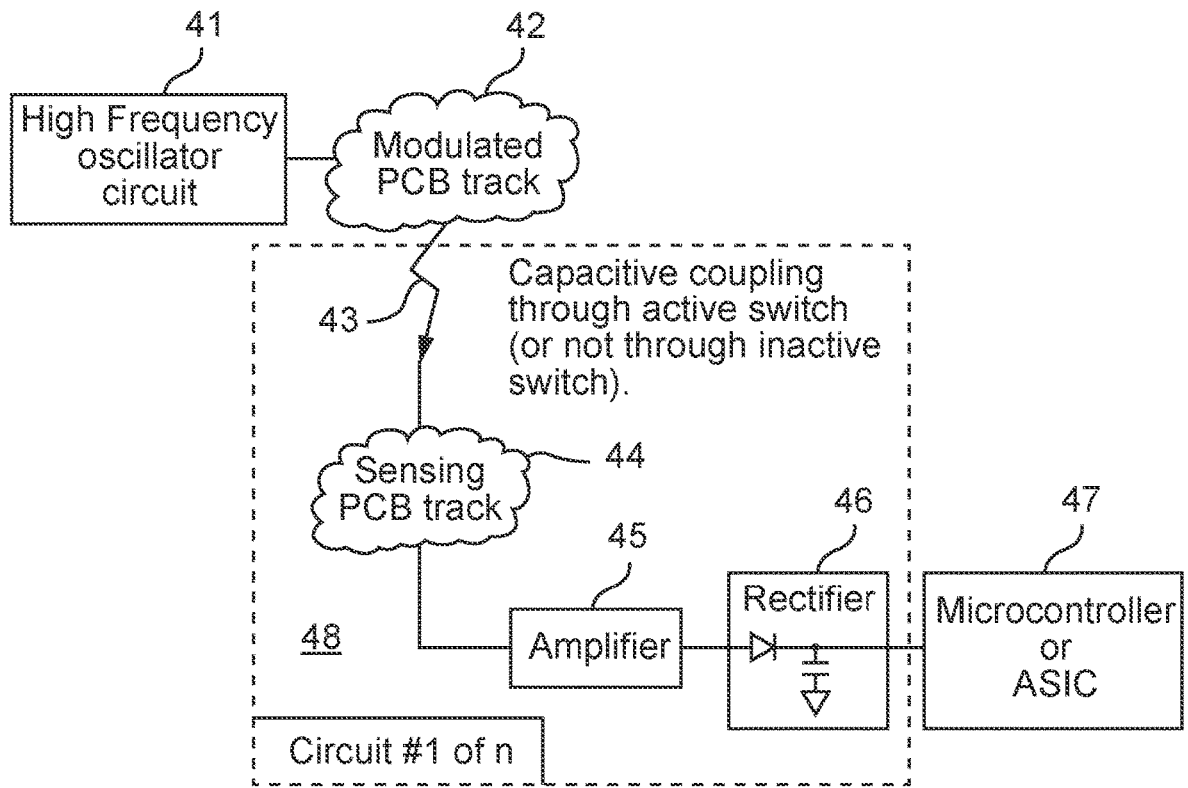
FIG. 4 is an example of a high-level schematic drawing illustrating how the capacitive switch embodiment of FIGS. 1-3 detects the position of the metallic plate.

FIG. 4 is a high-level schematic illustrating the operation of an embodiment of the invention. For illustrative purposes, only one switch is discussed. A high-frequency generator (oscillator circuit) 41 generates a high-frequency signal and applies the signal to a modulated PCB track 42. That signal is coupled through a closed switch 43, or not-coupled if it is open, to sensing PCB track 44. The high-frequency signal, if present, is sensed by a sensing circuit 48. There is one sensing circuit per switch. Here, only one sensing circuit is illustrated. Each sensing circuit includes a sensing PCB track 44, an amplifier 45 and a rectifier 46. Each sensing PCB track is paired with an extended finger 24a (FIG. 2) of the modulated PCB track, and may or may not be capacitively coupled with the corresponding finger depending on the position of the corresponding switch's metal plate. If the metal plate does couple the modulated PCT track with a sensing PCB track, the high-frequency signal will be sensed and amplified by amplifier 45. The amplified signal is then rectified by rectifier 46. The rectified signals for each of the switches are then read by a microcontroller or ASIC 47 which compares the amplitude of each signal against a predetermined threshold to determine the position of the switches.

It could be envisioned that a switch might have multiple positions near the nodes so as to interact with the nodes according to the position, enabling different values of the detected HF signal to indicate the different positions.

As an example of an installation, an installer may install the bases in an area, floor, building, or the like, and set the address switches on each base according to a blueprint or optionally, a smartphone app, installation instruction tables, etc. The bases can then be tested for wiring continuity and ground faults. The detectors can then be installed onto the previously addressed bases, and the fire panel programmed to recognize the addressable devices.

II. Optical Switch Detector Addressing Solutions

Alternatively, a mechanical-only set of switches may be located in the detector base; however in this solution, the switches may be white or light-colored in one position, and black or dark-colored in the other position. The detector itself has light detection components (either completely exposed or through a "window") capable of detecting the light and dark conditions, that correspond to the switches and indicate the switch positions. Each light detection component may consist of an LED paired with photo-detectors positioned as a pair above a corresponding switch.

Figure 5A:
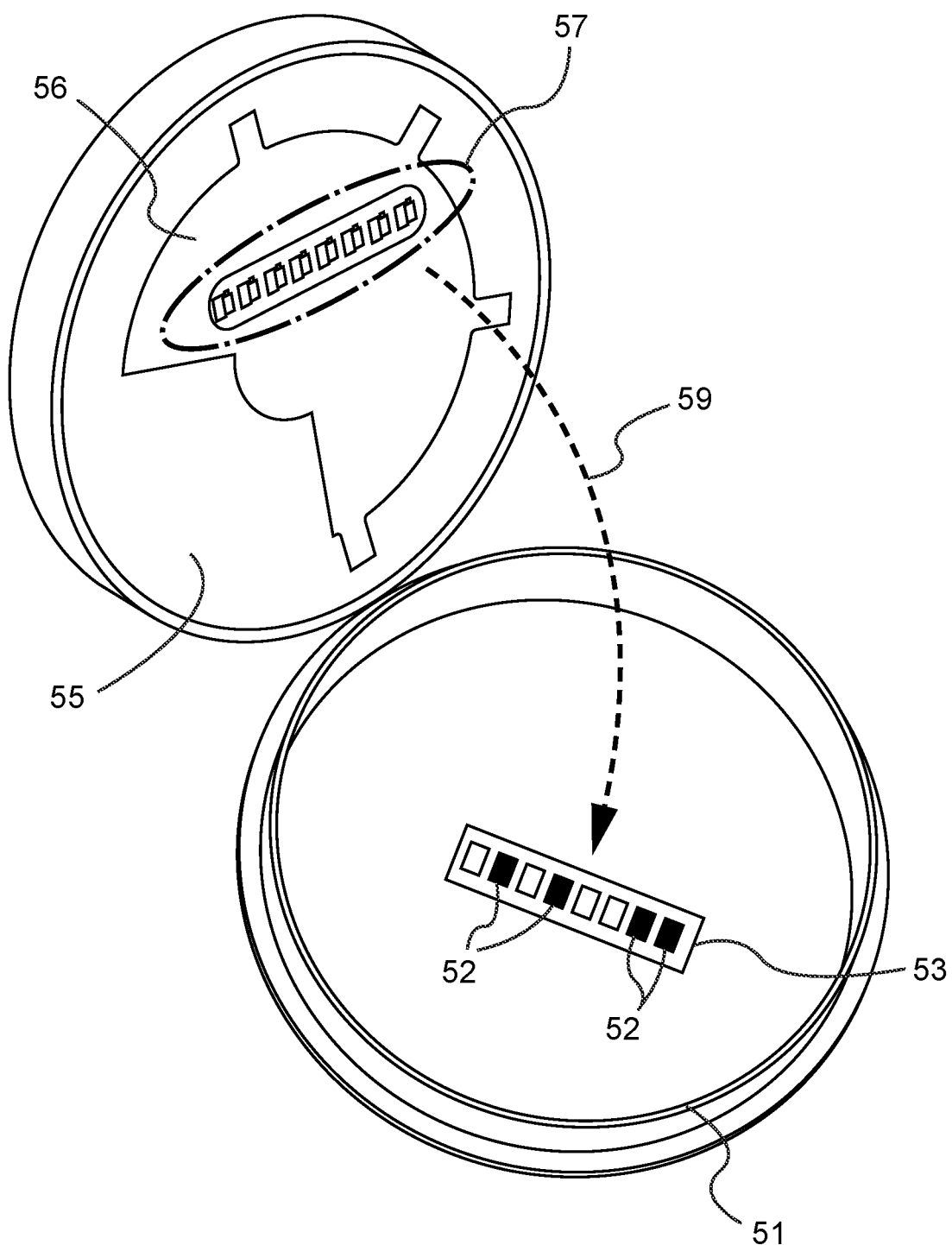
FIG. 5A is an example of a photograph illustrating a device base with a bank of switches in an optical switch embodiment, and a matching device head with a corresponding bank of light detection components.

FIG. 5A is a photograph illustrating a base 51 with a bank of switches 53. It can be seen that four of the switches 52 appear dark, while the others are light. The detector head 55 includes a circuit board 56 which has a bank of light detection components 57 that correspond to the switches 53.

The light detection components 57 (such as an LED/phototransistor pair, but note that an LED could be configured as a receiver in place of a phototransistor pairs; other types of optical detectors may also be used) are positioned to align with the switches 53 when the head is installed on the base 51, as shown by dotted line 59. The switches reflect light in one position, and absorb or redirect light in the other position, for example the four dark switches 52.

Figure 5B:
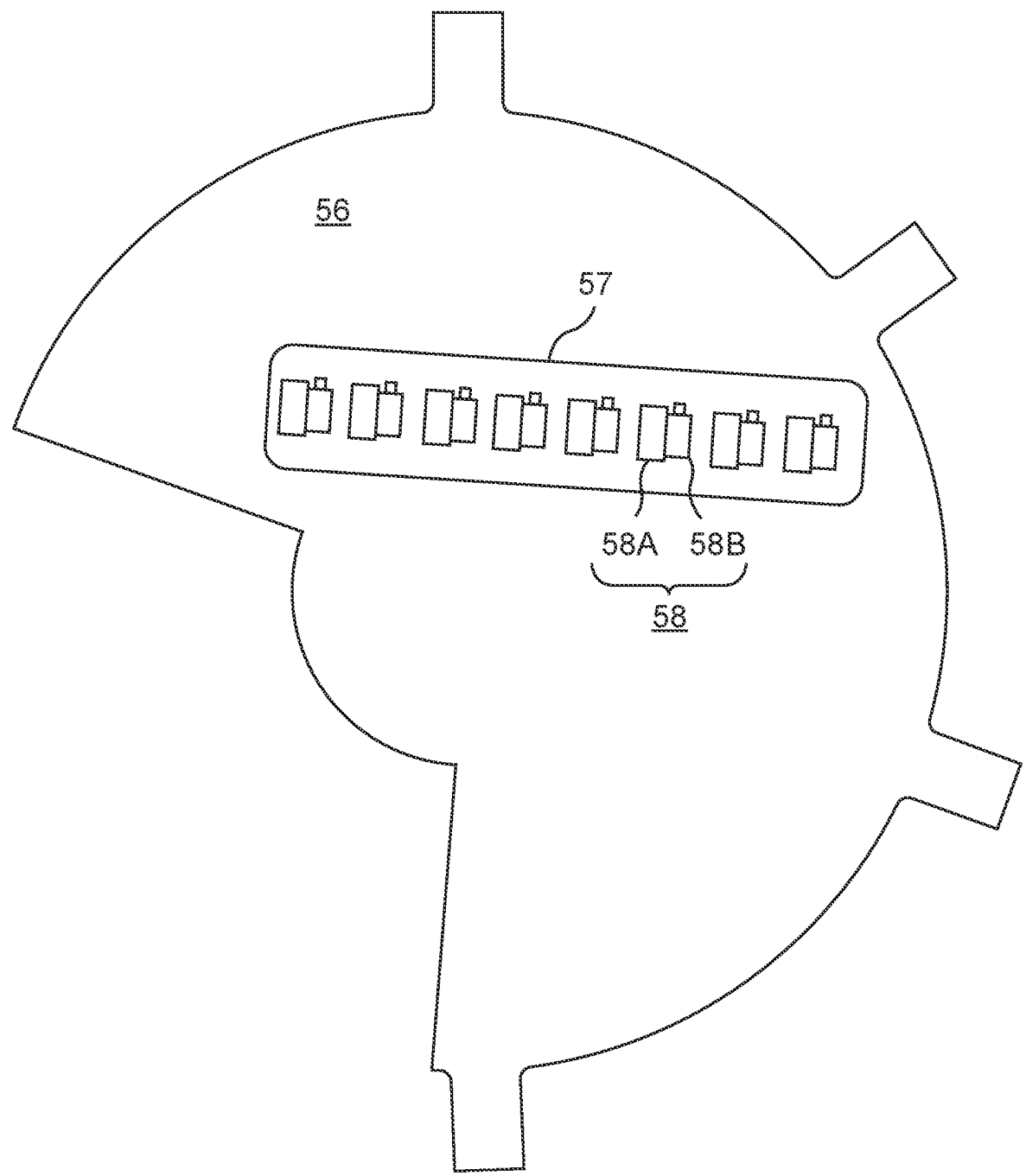
FIG. 5B is an example of an outline of the device head printed circuit board of FIG. 5A, illustrating details of the light detection components.

FIG. 5B is an outline of the printed circuit board 56 shown in FIG. 5A, clearly showing that each individual light detection component 58 comprises an LED 58A and a photodiode 58B.

Figure 5C:
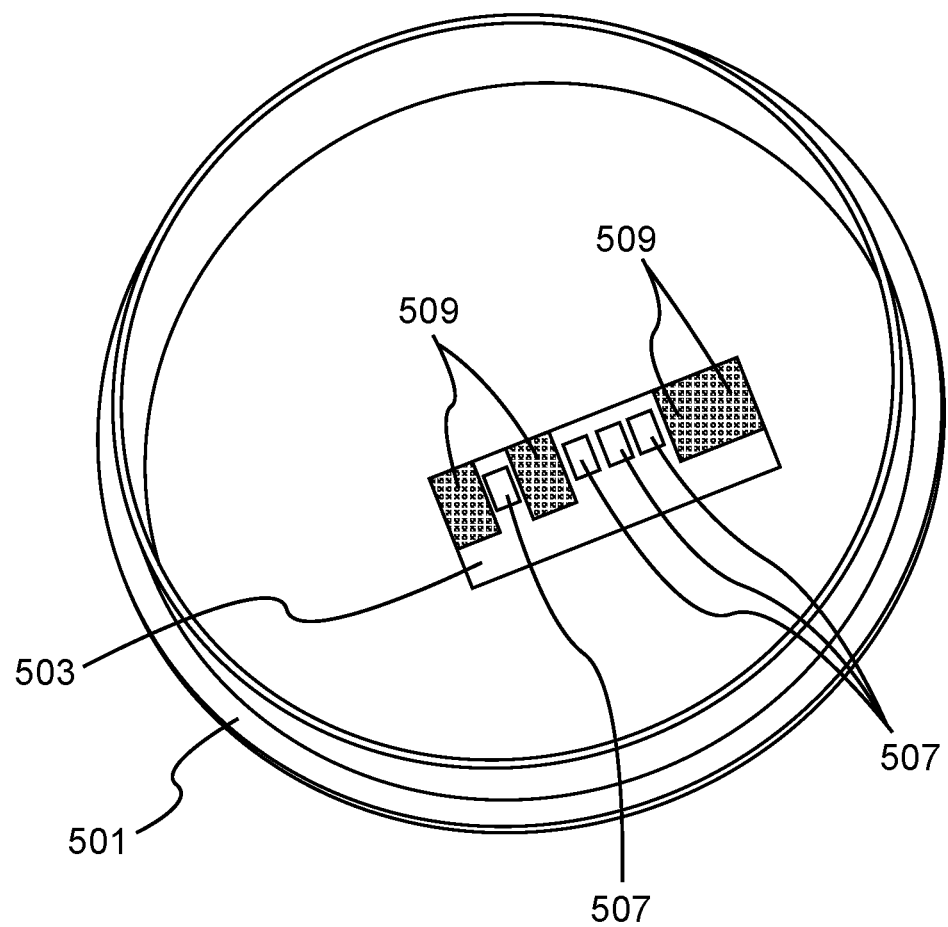
FIG. 5C is an example of a photograph illustrating an alternative optical embodiment in which a label is used in the device base instead of physically moving parts by filling in areas of the label such that they do not reflect light.

Alternatively, as FIG. 5C illustrates, a "barcode" type label could be used in the base on which the installer darkens the desired address in lieu of a physical switch, for example, by filling in a space with a black marker. Here, the base 501 includes a label 503. It can be seen that some of the spaces on the label have been darkened 509, while others 507 have not. The address selected by this configuration is $00111010_2$ or $58_{10}$, where the dark spaces are interpreted as 0's and the light spaces as 1's. The label can be read with the same optical solution (LED/phototransistor pair) as described above.

Figure 6A:
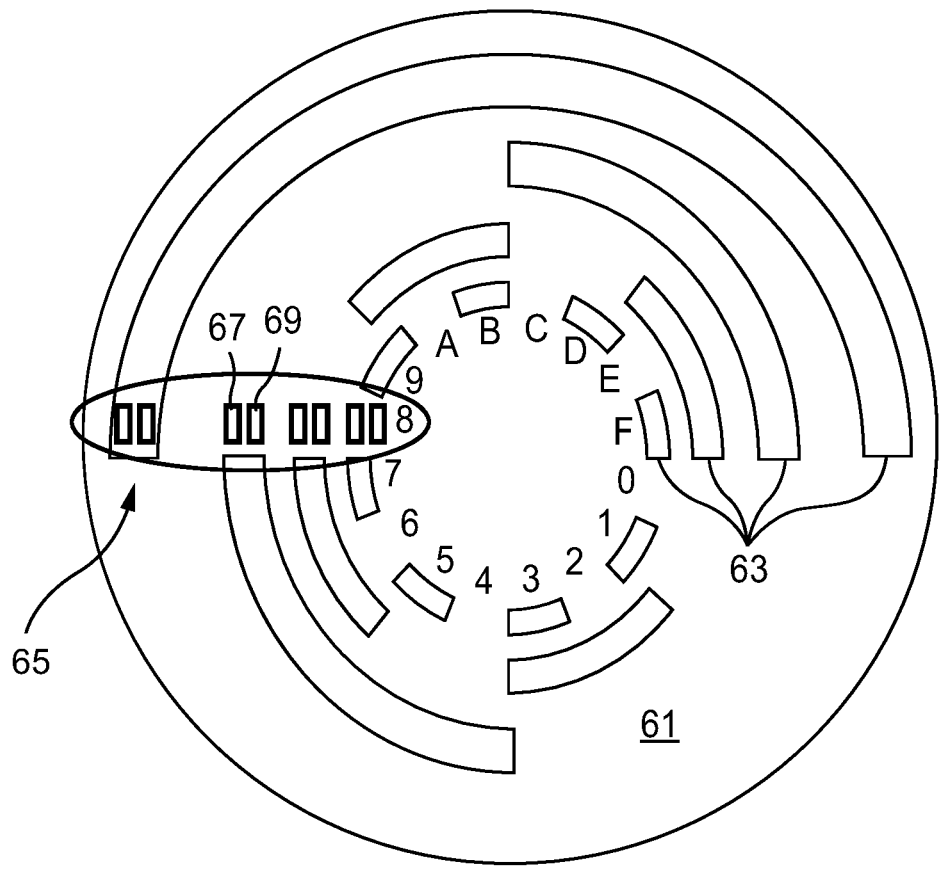
FIG. 6A illustrates an example of an optical embodiment in which a dial in the detector base, rather than a bank of switches, may be used to set an address.
Figure 6B:
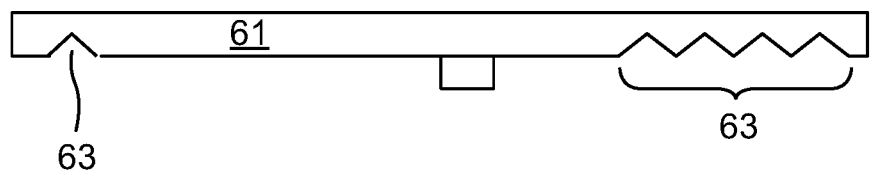
FIG. 6B illustrates another example of an optical implementation.

FIGS. 6A and 6B illustrate another embodiment in which a dial, rather than a bank of switches, may be used to set an address in the detector base without the base having any electronics. The address is read optically by the detector head. Here, there are no switches; the address depends instead on the orientation of the dial 61 with respect to the detector head. As shown in FIG. 6A, a dial 61 has a set of partial concentric grooves 63, with the inner most ring representing $2^0$ and the outermost ring representing (because there are four rings in this example) $2^3$. LED/sensor pairs 65 on the detector head (and shown here to show how the alignment works) correspond to each groove location, and determine whether a groove is present or not—presence being indicated by the shaded rings. Depending on the configuration of the dial, light from an LED 67 may be directed to a photodetector 69 to determine the "value" of a particular band. In the orientation shown, the $2^3$ position is the only one that has a groove; hence the address is set to 8. FIG. 6B shows a cut-away side-view of a dial 61, illustrating the grooves in the illustrated orientation.

One skilled in the art would recognize that there could more or less groove rings, thus increasing or decreasing the address space respectively. Alternatively, or in addition, multiple dials and corresponding LED/sensor pairs on the detector head could be used to expand the address space. The LED and phototransistor pairs are shown for illustrative purposes but they reside in the detector head, one pair for each groove on the dial in the detector base 63. In the "on" position for a given radius (four grooves shown), light from the corresponding LED is reflected back to the photodetector. In the "off" position, a switch does not reflect light to the photodetector. With the turning of the dial, the orientation of the grooves will change and a different address will be read. The bands may comprise grooves to represent darkened areas as has been discussed. Alternatively, a label may be used that has a printed pattern similar to that shown in FIG. 6A. The light from the LED may include infra-red light, visible light, and/or ultra-violet light.

Figure 7:
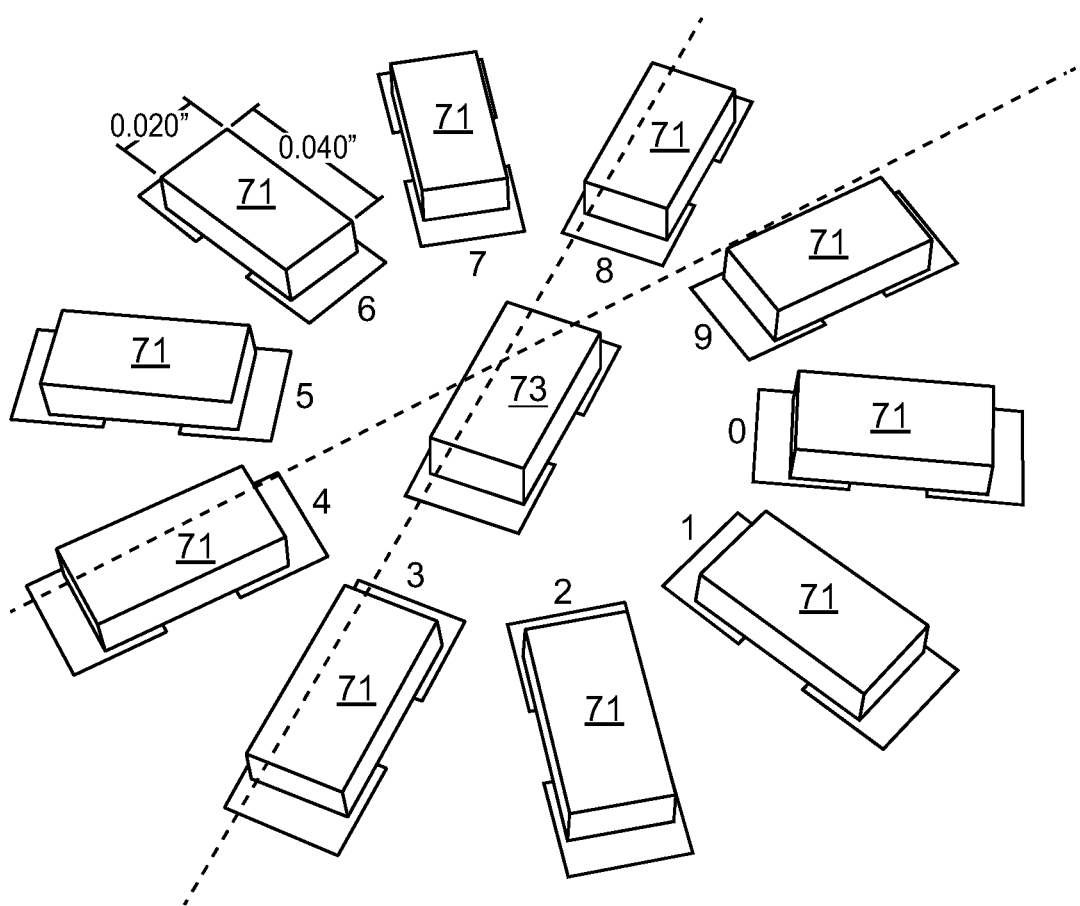
FIG. 7 illustrates an example of an optical embodiment in which a device base has a dial that reflects light from a central light source to one of several light sensors located radially around the light source, depending on the dial's position.

FIG. 7 illustrates yet another embodiment in which the base has a simple radial reflector within a dial (not shown) that reflects between one of plural radial light sensors 71 and a LED 73 in the middle. The detector 71 that detects the light from the LED indicates the dial position and hence the selected address. Conversely, there could be a single light sensor in the center and an array of light sensors distributed radially around the center. By pulsing the LEDs one at a time, and sensing for which pulse light is detected, the dial position can be determined. As with all the examples described above, there are no electronics in the base, just a rotatable dial with a reflector.

This concept provides a mechanical (easy, tool free) addressing solution without incurring the cost of an additional circuit board and connections in the base, or an even lower cost solution with the "barcode" approach.

III. Fire Alarm Peripheral Addressing Using a Smartphone

In this invention, the address of a device such as a smoke or heat detector is stored electronically. The address can be set by using a smartphone app that sends the address wirelessly to the device using Bluetooth or Near-Field Communication (NFC).

The use of a smartphone eliminates the requirement of a proprietary tool to set the address on fire alarm system peripherals. This solution also makes easy to change the address of a device while it is installed. In the case of NFC, it allows devices to be addressed without connecting them to anything, and in some cases without opening their packaging.

The smartphone may be used to program the base, or alternatively, a detector head. Because the NFC transceiver in the phone is used, no power is needed in the device being programmed. This may obviate the need for additional connectivity or communications in the device, resulting in significant cost savings. An NFC reader may be incorporated into the detector head so that when installed onto the base, the head uses its NFC reader to read the address from the base unit. Alternatively, the detector head could read the address from the base through additional electrical contacts (or through power contacts with the base).

In an embodiment, an installer, with the aid of a building layout, may determine the address required for a particular device in a particular location, office or hallway, etc. FIG. 10 illustrates a user interface of a mobile device app 100 that an installer would use.

The current address to be assigned is shown at 101. In this case, the address is "217". To change the address, the installer may use the incremental up and down buttons (102A and 102B respectively), or may use the keypad 104 to directly enter an address. The incremental buttons 102A, 102B are useful when assigning addresses sequentially or near sequentially.

When the desired address is showing at 101, the installer may then hold the mobile device close to the base and select the ADDRESS DEVICE button 103. If the same address has previously been programmed into another device, the mobile device may alert the installer audibly with a beep or voice, or a message showing on the screen, or even dimming the address before the ADDRESS DEVICE button is selected.

When all of the detectors have been scanned and installed, the file containing the information (address and unique identifier) can be transferred to the Programmer software, which may then be used to program the panel.

IV. Fire Alarm Peripheral Addressing Using a Unique Identifier

Figure 8B:
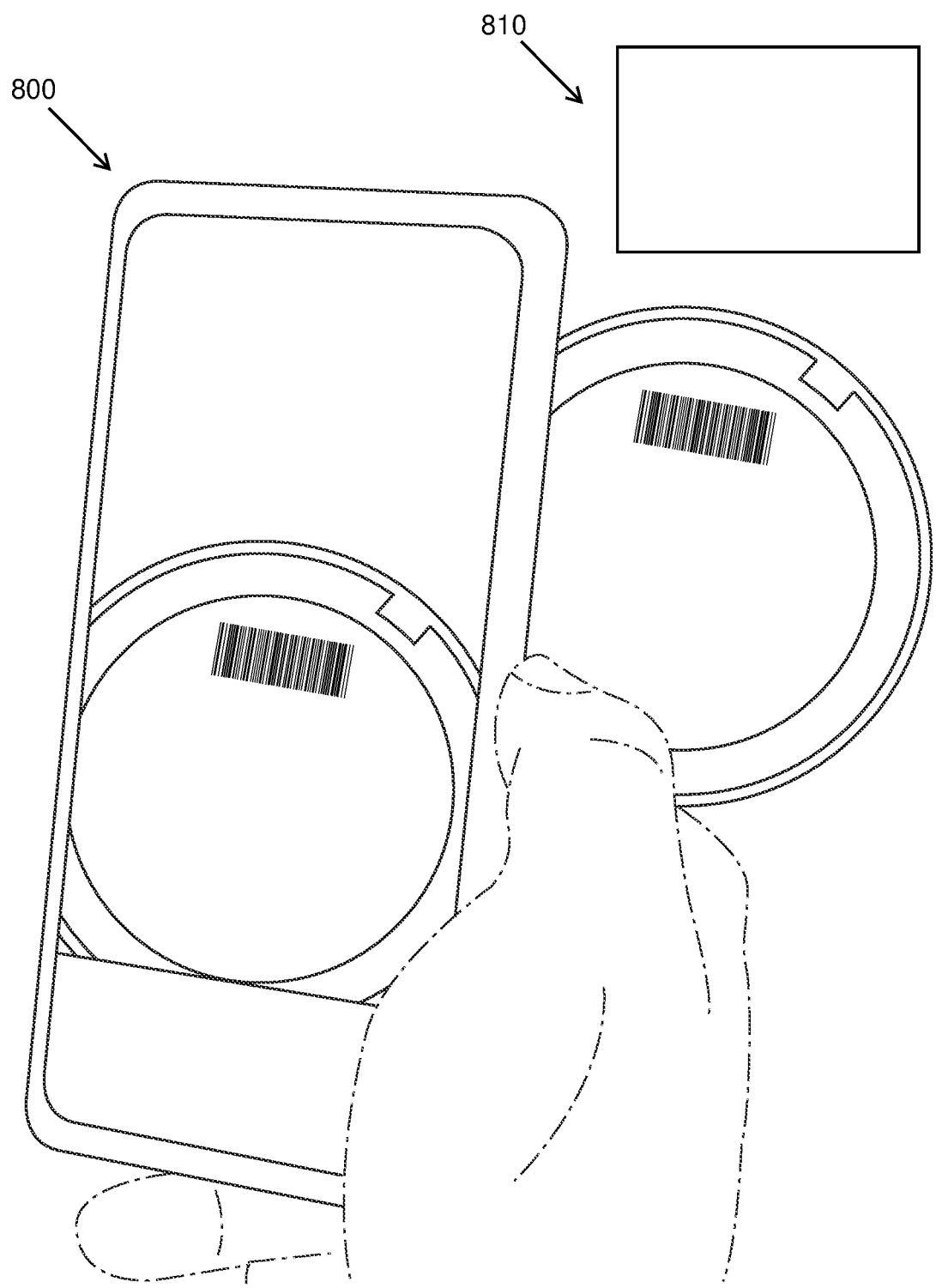
FIG. 8B is a photograph illustrating an example of a mobile device being used to scan the identifier.

FIGS. 8A and 8B illustrate an exemplary embodiment in which each addressable fire alarm peripheral contains a unique digital identifier (similar to a MAC address) that is assigned during production. For example, the unique identifier may be stored on a barcode on the detector and in non-volatile memory.

During installation, a configuration file generated by a Programmer application on a PC may be installed onto a mobile/smart device, such as a smartphone, smartpad or some other mobile device capable of reading a barcode or QR code, etc. The detector bases may be installed on ceilings or walls. After testing and correcting wiring as needed, construction at the site may be completed. FIG. 8A illustrates a mobile app interface 80 that an installer may use to register and associate an address to the unique digital identified in the detector.

In this example, the shaded rows represent devices that have already been associated with an address. For example, the second row 81 represents a detector that has been labeled as "Atrium NE". The unique ID of that detector is 3C4A1, and that detector has been assigned to address "2".

The unshaded rows represent devices that have not yet been scanned and assigned an address. For example, the sixth row 82 does not show a code or unique ID, indicating that no detector head has been assigned to that location yet. The installer, noting that a device for the location "Conference Rm" has not yet been assigned, would go to that location (Conference Rm), and press the SCAN button 83 for that row 82.

At this point a scanner will appear on the smart device, allowing the installer to scan the bar code on the detector head and read the unique identifier embedded thereon as illustrated in FIG. 8B. The unique ID will then appear on that line in the CODE column and is automatically associated with address "6". The installer could then repeat the process for "Classroom" and so on. Note that each row has a SCAN button which turns into a RESCAN button, allowing the installer to rescan a device, or later replace the installed device with another device with a different unique identifier. For example, in row 81, the button 84 has changed to "RESCAN" because the address "2" has already been assigned, but if the assignment needs to be redone, for example if the installer made a mistake, the installer can press RESCAN and reassign the address.

After scanning the detector head and assigning an address to it, it can be mounted onto the base at that location. The scanned detector information (address, label, unique identifier/code) can then be transferred from the smart device back to the Programmer, which can then be used to program the panel. The panel may then initialize all devices on the loop by communicating their functional address (1, 2, 3 . . . ) to them using the unique identifier. The communication may be real-time or delayed.

An installer can initiate this configuration of the fire panel from the mobile device.

In an alternative installation method, a configuration file may not be first generated by the Programmer software. Instead the installer, presented with a smart device user interface 90 as shown in FIG. 9, may select or scan an address from a building plan. The installer would then go to the location identified in the plan corresponding to the selected address.

The current address to be assigned is shown at 91. In this case, the address is "217". To change the address, the installer may use the incremental up and down buttons (92A and 92B respectively), or may use the keypad 94 to directly enter an address. The incremental buttons 92A, 92B are useful when assigning addresses sequentially or near sequentially.

When the desired address is showing at 91, the installer may then select the SCAN DETECTOR button 93. As with the previous installation method, a scanner will appear on the smart device (refer back to FIG. 8B), allowing the installer to scan the bar code on the detector head and read the unique identifier embedded thereon. The installer may then install the detector onto the corresponding base.

The scanned detector information (address, label, unique identifier/code) can then be transferred from the smart device back to the Programmer, which can then be used to program the panel. The panel may then initialize all devices on the loop by communicating their functional address (1, 2, 3 . . . ) to them using the unique identifier.

An installer can initiate this configuration of the fire panel from the mobile device.

In alternate embodiments, the unique identifiers could be attached to bases rather than to the detector heads. As such, no new addressing would need to occur should a detector head need replacement.

Alternatively, a first portion of the unique identifier may be stored in the detector head and a second portion of the unique identifier stored in the base. This could be useful if, for example, there is a desire to maintain an association between the device and the base.

An aspect of the present disclosure is shown in FIG. 8B. The installer may utilize a smart device 800 to scan a fire alarm peripheral to read the unique identifier embedded thereon. Next, the installer may use the smart device 800 to transmit the unique identifier and the associated address to an external resource 810, which may be a fire panel.

V. Auto Addressing

In yet another embodiment for assigning addresses, the bases may first be installed, wiring tested and construction finished. The panel is placed into commissioning mode, and the detector heads are installed in a specific order according to a plan that indicates the order in which the detectors head are to be installed. Each detector, upon its installation, announces itself to the panel, and the panel then automatically assigns the next logical address.

What is claimed is:

1. A smartphone application on a handheld device, comprising:
    a user interface configured to display one or more addresses, one or more unique identifiers each corresponding to an assigned address of the one or more addresses, one or more labels, and a control button; and
    a scanning window configured to appear upon a user activating the control button associated with a selected address of the one or more addresses, the scanning window reading a unique identifier on a fire alarm peripheral to be installed at a location,
    wherein the smartphone application communicating the selected address and the scanned unique identifier to an external resource.

2. The smartphone application of claim 1, wherein each unique identifier is at least one of: a bar code, a QR code, or text.

3. The smartphone application of claim 2, wherein the handheld device is one of a smartphone or a tablet.

4. The smartphone application of claim 1, wherein:
    the user interface further displays one or more labels each associated with the one or more addresses; and
    the location is associated a selected label of the one or more labels.

5. The smartphone application of claim 1, wherein the application is configured to send the unique identifier to a memory in the handheld device for storage.

6. The smartphone application of claim 1, wherein the external resource is a fire panel.

7. A non-transitory computer readable medium having instructions stored therein that, when executed by one or more processors of a handheld device, cause the one or more processors to:
    display one or more addresses, one or more unique identifiers each corresponding to an assigned address of the one or more addresses, one or more labels, and a control button;
    display, in response to a user activating the control button associated with a selected address of the one or more addresses, a scanning window for reading a unique identifier on a fire alarm peripheral to be installed at a location; and
    read, in response to the user aligning the unique identifier to the scanning window, the unique identifier via a camera of the handheld device.

8. The non-transitory computer readable medium of claim 7, wherein each unique identifier is at least one of a bar code, a QR code, or text.

9. The non-transitory computer readable medium of claim 8, wherein the handheld device is one of a smartphone or a tablet.

10. The non-transitory computer readable medium of claim 7, further comprises instructions that, when executed by the one or more processors of the handheld device, cause the one or more processors to display one or more labels each associated with the one or more addresses; and
    wherein the location is associated a selected label of the one or more labels.

11. The non-transitory computer readable medium of claim 7, further comprises instructions that, when executed by the one or more processors of the handheld device, cause the one or more processors to send the unique identifier to a memory in the handheld device for storage.

12. The non-transitory computer readable medium of claim 7, further comprises instructions that, when executed by the one or more processors of the handheld device, cause the one or more processors to send the selected address and the scanned unique identifier to an external resource.

13. The non-transitory computer readable medium of claim 12, wherein the external resource is a fire panel.

14. A handheld device:
    a touch-sensitive display;
    a user interface having a control button; and
    a processor configured to:
        display, on the touch-sensitive display, one or more addresses, one or more unique identifiers each corresponding to an assigned address of the one or more addresses, and one or more labels; and
        display, on the touch-sensitive display, in response to a user activating the control button associated with a selected address of the one or more addresses, a scanning window for reading a unique identifier on a fire alarm peripheral to be installed at a location; and
        read, in response to the user aligning the unique identifier to the scanning window, the unique identifier via a camera of the handheld device.

15. The handheld device of claim 14, wherein each unique identifier is at least one of a bar code, a QR code, or text.

16. The handheld device of claim 15, wherein the handheld device is one of a smartphone or a tablet.

17. The handheld device of claim 14, wherein:
the processor is further configured to display one or more labels each associated with the one or more addresses; and
the location is associated a selected label of the one or more labels.

18. The handheld device of claim 14, further comprises a memory, wherein the processor is further configured to send the unique identifier to the memory in the handheld device for storage.

19. The handheld device of claim 7, wherein the processor is further configured to send the selected address and the scanned unique identifier to an external resource.

20. The handheld device of claim 19, wherein the external resource is a fire panel.

* * * * *